United States Patent [19]

Hilgers

[11] Patent Number: 4,829,670
[45] Date of Patent: May 16, 1989

[54] METHOD OF MANUFACTURING AN ELECTRICAL CONNECTOR BOX

[75] Inventor: Ray Hilgers, Schaumburg, Ill.

[73] Assignee: Advanced Molding Technology, Incorporated, Schaumburg, Ill.

[21] Appl. No.: 102,864

[22] Filed: Sep. 30, 1987

[51] Int. Cl.⁴ .................... H01R 43/04; B29C 45/14
[52] U.S. Cl. .................................. 29/882; 264/250; 264/263; 264/272.14; 264/272.15; 29/883; 29/884
[58] Field of Search ................ 264/250, 263, 272.15, 264/272.14, 261; 29/882, 883, 884, 845

[56] References Cited

U.S. PATENT DOCUMENTS

| | | | |
|---|---|---|---|
| 2,590,821 | 7/1952 | Kiser | 173/34 |
| 2,862,992 | 12/1958 | FRanz | 174/52 |
| 3,084,391 | 4/1963 | Parstorfer | 264/255 |
| 3,086,251 | 4/1963 | Bernat | 264/255 |
| 3,093,432 | 6/1963 | King | 339/59 |
| 3,141,054 | 7/1964 | Francis | 264/255 |
| 3,487,353 | 12/1969 | Massa | 339/89 |
| 3,609,630 | 9/1971 | Francis | 339/14 P |
| 3,685,006 | 8/1972 | Jerrold-Jones | 339/177 R |
| 3,945,708 | 7/1976 | Griffin | 339/189 R |
| 3,998,824 | 12/1976 | Otsuki et al. | 264/263 X |
| 4,045,868 | 9/1977 | Ammon et al. | 29/882 X |
| 4,293,182 | 10/1981 | Schwartz | 339/275 R |
| 4,497,756 | 2/1985 | Bouchard et al. | 264/272.15 X |
| 4,638,559 | 1/1987 | McGonigal | 29/882 X |

*Primary Examiner*—Jan H. Silbaugh
*Assistant Examiner*—Nick Krisch
*Attorney, Agent, or Firm*—McAndrews, Held & Malloy, Ltd.

[57] ABSTRACT

A single plastic insert includes a plurality of apertures which receive in interference fit a plurality of metal terminal pegs of a plurality of metal terminal inserts, the terminal pegs of the metal inserts are forced into the apertures of the plastic insert. The plstic insert is positioned in an article mold prior to injection molding using liquid plastic.

5 Claims, 8 Drawing Sheets

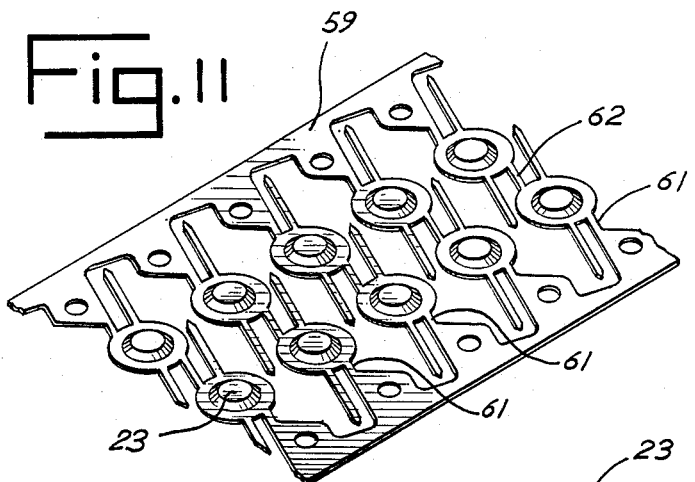
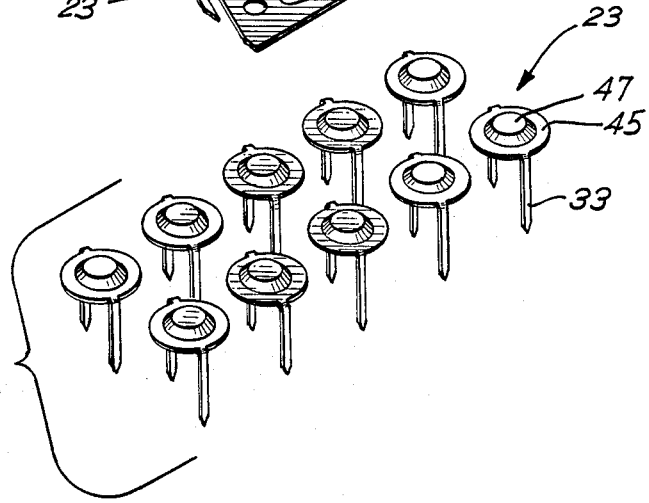
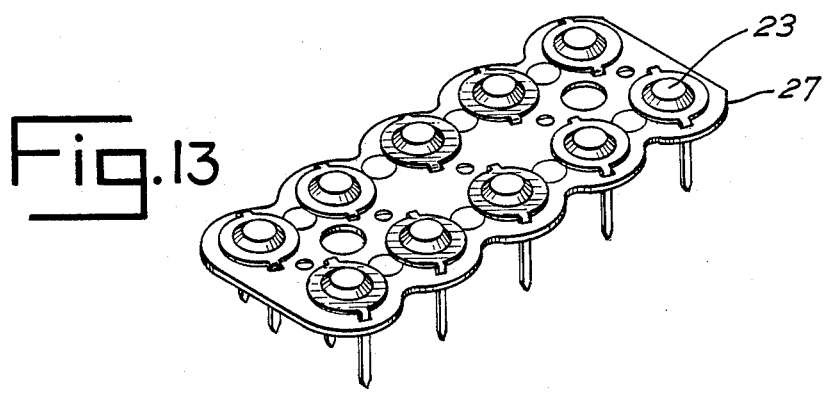

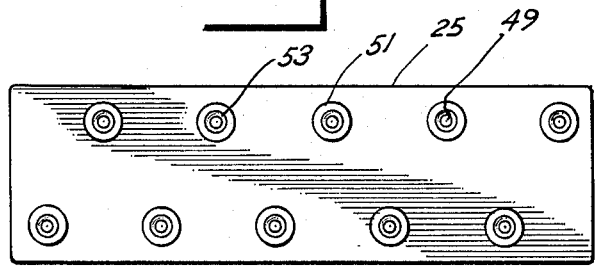
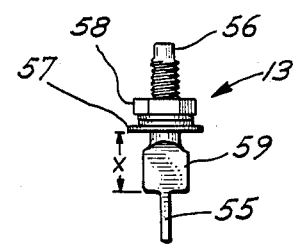
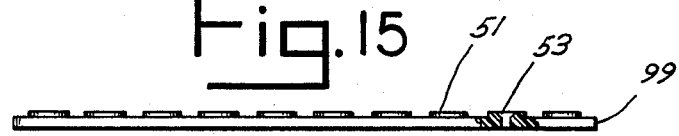
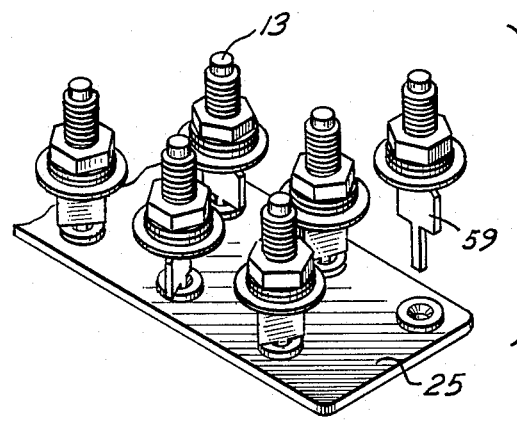
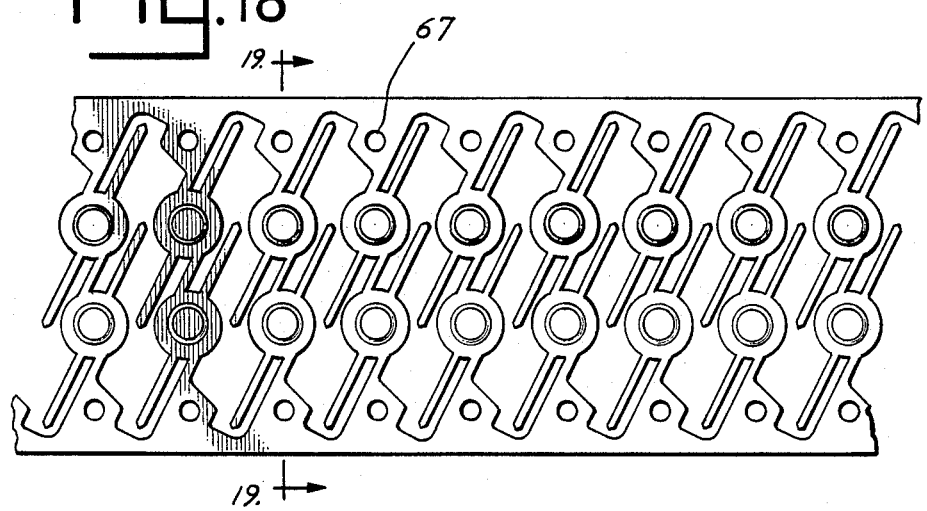

METHOD OF MANUFACTURING AN ELECTRICAL CONNECTOR BOX

BACKGROUND OF THE INVENTION

The invention relates to a method of molding an electrical connector box and more particularly relates to a method of injection molding an electrical connector box having metal electrical terminal inserts.

When plastic molding a particular product having metal inserts, liquid plastic is injected between two mold halves that are firmly held together. One or both of the mold halves includes a number of apertures for receiving the metal inserts. Prior to plastic molding, the operator takes each of the separate metal inserts and positions them within the mold halves. The mold is then closed and liquid plastic is injected within the mold encapsulating portions of the inserts to hold them in position in the final product. The plastic is cooled and the mold is then opened for removal of the particular device.

In such a procedure, the operator necessarily spends time in placing each separate metal insert within the mold. The more inserts to be placed, the longer the time, and thus greater the cost of making the product. This is particularly true of an electrical connector box which has many metal terminals.

Further, where there are a large number of metal inserts and where the metal inserts are of a small size, the machining of the mold halves to receive each of the many small insert is complex as well as costly.

It is therefor an object of the present invention to provide a method of manufacturing an electrical connector box which has a plurality of electrical terminals in a quick and simple procedure.

It is a further object of the present invention to reduce the amount of operator time needed to manufacture an electrical terminal connector box.

It is yet another object of the present invention to simplify the mold used to manufacture an electrical terminal connector box.

SUMMARY OF THE INVENTION

These and other objects of the invention are achieved in the molding of a single plastic insert which includes a plurality of apertures for receiving in interference fit each terminal peg of the plurality of terminal inserts. The terminal pegs of the metal inserts are forced into the apertures of the molded plastic insert. The single plastic insert provides a single unit for positioning in the article mold prior to injection of liquid plastic.

BRIEF DESCRIPTION OF THE DRAWING

FIG. 11 is a perspective view of a metal web of electrical terminal contacts used in the connector block of FIG. 1.

FIG. 12 shows a plurality of terminal contacts after being removed from the web of FIG. 11.

FIG. 13 shows the plurality of terminal contacts of FIG. 12 having been forced into the carrier strip of FIG. 6.

FIG. 14 is a second carrier strip for use in manufacturing the connector block of FIG. 1.

FIG. 15 is a side view and partial cross section of the carrier strip of FIG. 14.

FIG. 16 is a side view of an electrical terminal stud used to manufacture the connector box of FIG. 1.

FIG. 17 shows the insertion of the terminal studs of FIG. 16 into the carrier strip of FIG. 14.

FIG. 18 is a top view of the metal web of terminal contacts of FIG. 11.

FIG. 19 is a cross sectional end view of the web of FIG. 18 taken along line 19—19.

DETAILED DESCRIPTION OF THE PREFERRED EMBODIMENT

Figure 1:
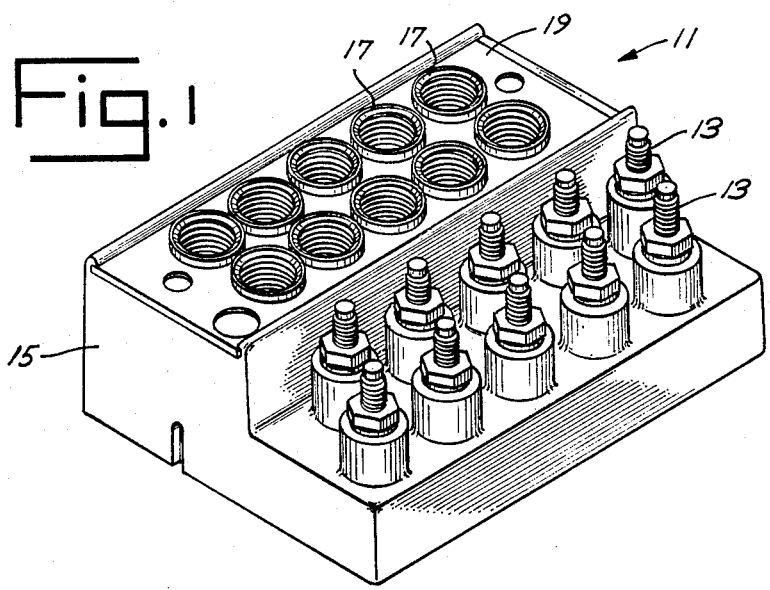
FIG. 1 is a perspective view of an electrical connector block manufactured according to the method of the present invention.

Referring to FIGS. 1-5, a terminal connector block 11 is to be manufactured using the method of the present invention. Terminal block 11 includes a plurality of terminal studs 13 which are made of conductive metal. Terminal studs 13 are encased in plastic material to form a plastic housing 15 of the block 11.

As shown in FIG. 16, terminal stud 13 includes a threaded top portion 56 which receives a bolt 58 for securing an electrical conductor (not shown) to the terminal stud. A terminal leg 55 forms the bottom portion of the stud and may receive wire wrapping to form an electrical connection with the conductor after it is bolted down to the top portion of the stud.

Figure 5:
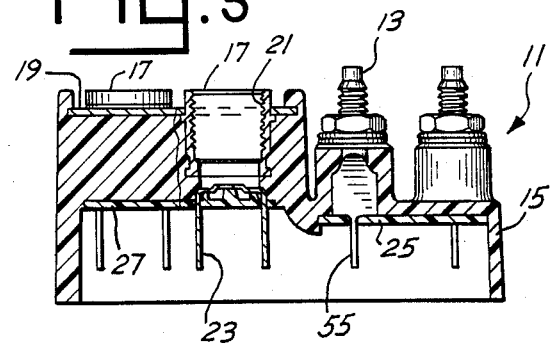
FIG. 5 is a cross sectional side view of the connector block of FIG. 2 taken along line 5—5.

Referring again to FIG. 1, housing 15 also encapsulates metal terminal openings 17 which are connected to a flat, planar, metal connector plate 19. As shown in FIG. 5, terminal openings 17 are generally cylindrical in shape and include a threaded inner wall 21 for receiving an electrical conductor (not shown). Plastic housing 15 encapsulates the outer surface of terminal openings 17 which lies below connector plate 19. The inside of openings 17 must remain free of plastic for receiving an electrical conductor.

Figure 2:
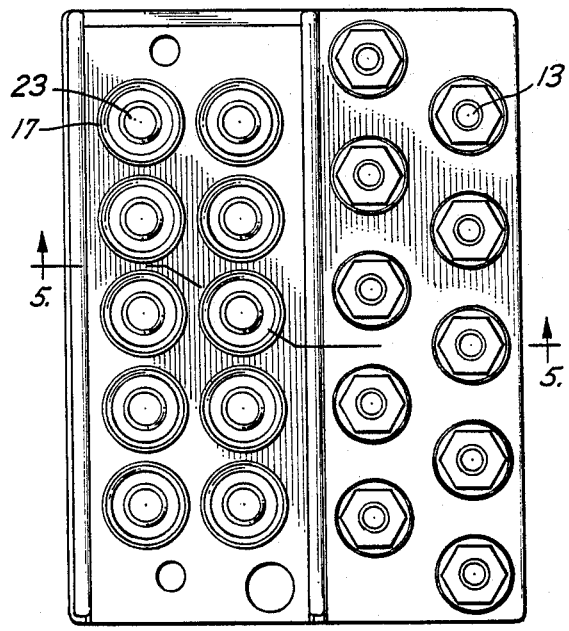
FIG. 2 is a top view of the connector block of FIG. 1.
Figure 3:
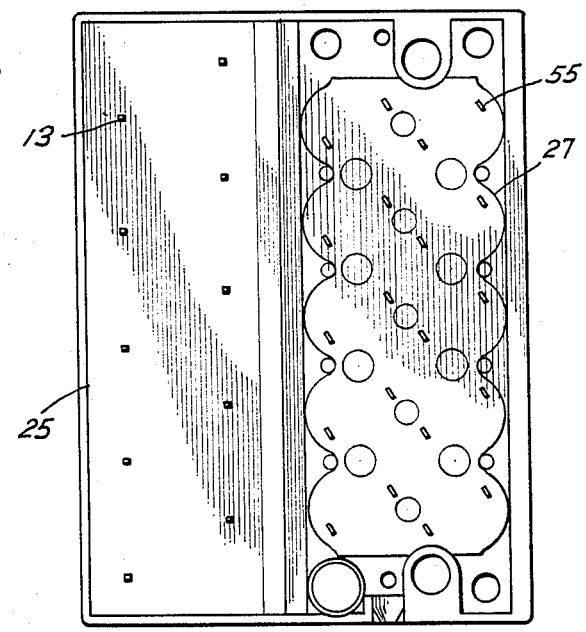
FIG. 3 is a bottom view of the connector block of FIG. 1.
Figure 4:
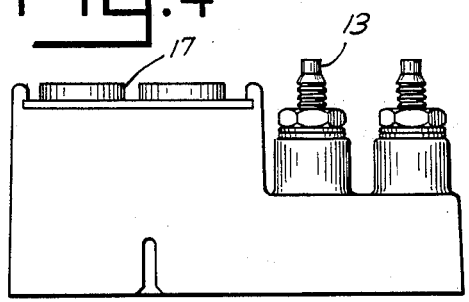
FIG. 4 is a side view of the connector block of FIG. 1.

A terminal contact 23, shown separate in FIG. 12, is positioned below the terminal openings 17 (as shown in FIG. 5) for making electrical contact with the electrical connector when threaded into opening 17. Terminal contact 23 is spaced apart from metal terminal opening 17 avoiding any electrical contact therewith. No plastic from the injection molding of the housing can be permitted to move between the metal opening 17 and the contact 23, in order to provide a clear passage for allowing the electrical conductor to make contact with contact 23. As shown in FIG. 2, the contact 23 can be viewed through connector openings 17.

The connector block of FIG. 1 is shown having ten (10) terminal openings 17 and ten (10) terminal studs 13. As will suggest itself, connector block 11 may be manufactured in very long lengths having many pairs of terminal openings and pairs of terminal studs disposed along it length. The terminal block may be manufactured in lengths having multiples of 10 terminal openings and 10 terminal studs to simplify manufacture. That is, connector block 11 may be manufactured to include ten (10) or twenty (20) or thirty (30), etc., terminal studs and terminal openings, each.

As shown in FIG. 5, each of the terminal studs 13 are carried by a first plastic carrier strip 25. Prior to injection molding, the carrier strip 25 is initially molded from plastic. Terminal studs 13 are forced into apertures 49 which are molded in the carrier strip 25. See FIGS. 14–17. Terminal legs 55 have a square cross-section whereas apertures 49 are circular. This permits the shaft 55 to be inserted without the need to orient the shaft to the shape of the aperture. The middle portion 59 of the stud abuts against the top of strip 25. After the terminal studs have been inserted into carrier strip 25, the resulting unit of studs and carrier strip are positioned in the mold as described hereinafter.

Referring again to FIG. 5, terminal contacts 23 are carried by a second carrier strip 27. Prior to molding of housing 15, terminal contacts 23 are forced into the second carrier strip 27, as shown in FIG. 13. Both carrier strips 25, 27 are molded from a plastic having a higher melting temperature than the temperature of the liquid plastic which is injected into the mold to mold housing 15.

Referring to FIGS. 6–10, second carrier strip 27 is initially molded from plastic. A breakaway line 29 is molded in the carrier strip in order to permit the strip to be broken into separate strips for receiving multiples of 10 terminal contacts.

Figure 9:
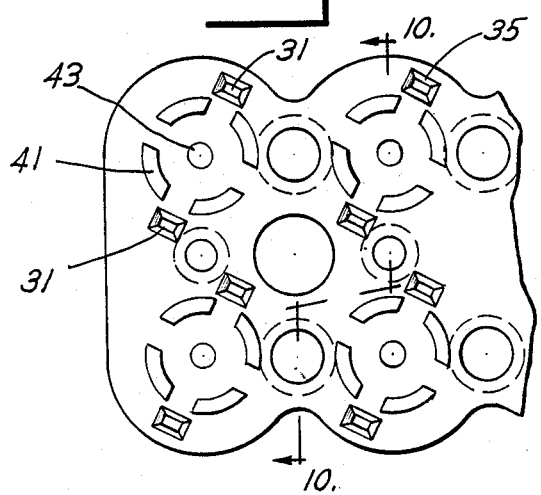
FIG. 9 is an enlarged view of a portion of the carrier strip of FIG. 6.
Figure 10:
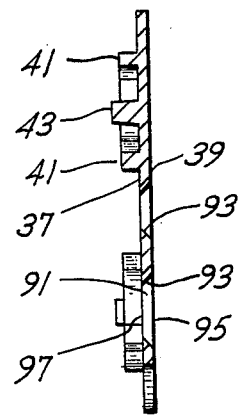
FIG. 10 is a cross sectional view of the carrier strip of FIG. 9 taken through the line 10—10.

As shown in FIG. 9, openings 31 are molded into the carrier strip for receiving the terminal legs 33 (FIG. 12) of a terminal contact 23. Openings 31 are formed by four bevelled surfaces 35 which slant from the top surface 37 of the strip to the bottom surface 39 of the strip as shown in FIG. 10 in order to define openings 31. As shown in FIG. 12, terminal legs 33 are rectangular in cross-section and have a pointed end. The bevelled surfaces 35 serve to guide and align terminal legs 33 as the legs are inserted through openings 31 in the carrier strip.

As shown in FIG. 9, four raised arcuate members 41 are molded into strip 27 and are disposed in a generally circular path between a pair of openings 31. Contact 23 includes a circular cap 45 (FIG. 12) having a raised central portion 47. Circular cap 45 seats against the raised arcuate members 41 of the strip after the terminal contact has been forced though openings 31 (FIG. 13). The openings 31 are of a size which provides an interference fit of the terminal legs 33 within openings 31. The interference fit serves to retain terminal contacts 23 to the carrier strip 27 and serves as a seal to prevent liquid plastic from seeping out and around terminal legs 33 during the injection molding process, i.e., plastic flashing is prevented.

Referring again to FIG. 10, a raised cylindrical member 43 is molded into strip 27 and is somewhat higher than raised arcuate members 41. Cylindrical member 43 makes contact with raised central portion 47 of the circular cap 45 of terminal contact 23 when the contact is forced into the strip. Member 43 provides mechanical support when the electrical conductor is screwed down against terminal contact 23.

Referring to FIGS. 14–17, first carrier strip 25 includes 10 openings 49 for receiving the single terminal leg 55 of a terminal stud 13. A raised ring member 51 is molded into carrier strip 25 for surrounding openings 49. As shown in FIG. 15, openings 49 are defined by bevelled or funnel-shaped surfaces 53 which are molded into the strip. The bevelled surfaces 53 act as guiding surfaces for the terminal legs 55 of terminal studs 13 as the terminal legs are forced into openings 49. The raised ring member 51 compensates for the slight difference in length x (FIG. 16) between the top of terminal leg 55 and the bottom surface of a support member 57. The bottom of a flat portion 59 of the terminal stud may be forced into the raised ring member 51 of the strip 25 in order to compensate for the different distance x of the terminals 13. This may occur when the mold is closed prior to molding housing 15.

In order to speed the manufacturing process, terminal contacts 23 are stamped from a metal web 59 as shown in FIGS. 11, 18 and 19. Each of the terminal contacts 23 remain connected to web 59 at two web portions 61, 62. Contacts 23 must be broken away from the web at web portions 61, 62 and then terminal legs 33 must be bent downward, as shown in FIG. 12, prior to insertion of contacts 23 within the carrier strip 27, as shown in FIG. 13.

Figure 20:
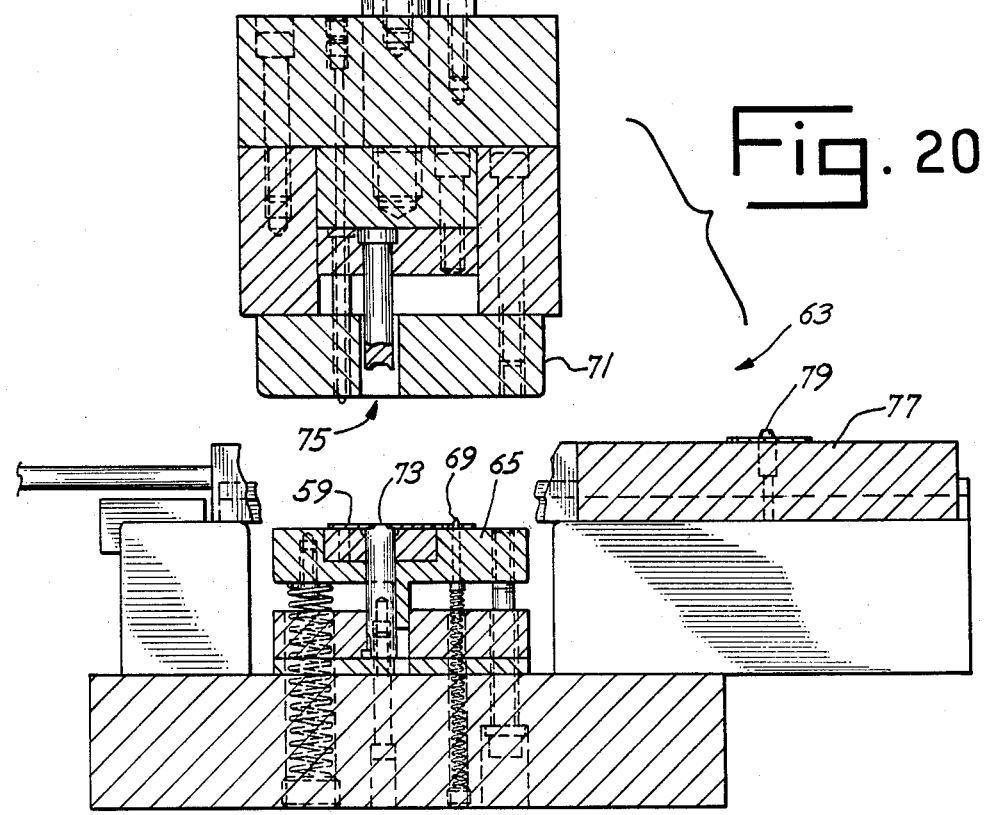
FIG. 20 is a partial side and cross-sectional view of apparatus used for inserting the terminal contacts from the web of FIG. 11 into the carrier strip of FIG. 13.

Referring to FIG. 20, a cutting/bending/inserting apparatus 63 removes each of the terminal contacts 23 from web 59 and then inserts the contacts into carrier strip 27. Web 59 is positioned onto a support member 65 of apparatus 63. Alignment apertures 67 (FIG. 18) are formed in the web and serve to receive a plurality of pins 69 of apparatus 63 for aligning the web onto support member 65.

Figure 22:
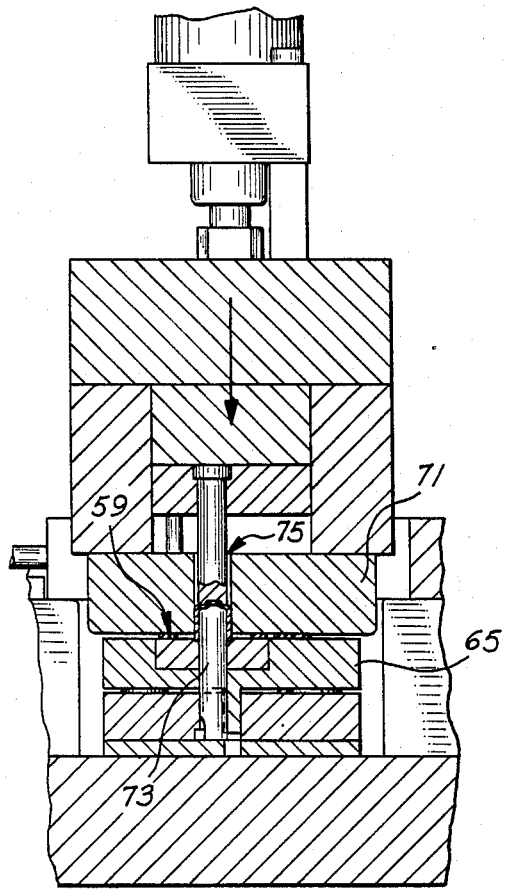
FIGS. 22-24 are side and cross-sectional views showing the apparatus of FIG. 20 in various operational positions.
Figure 23:
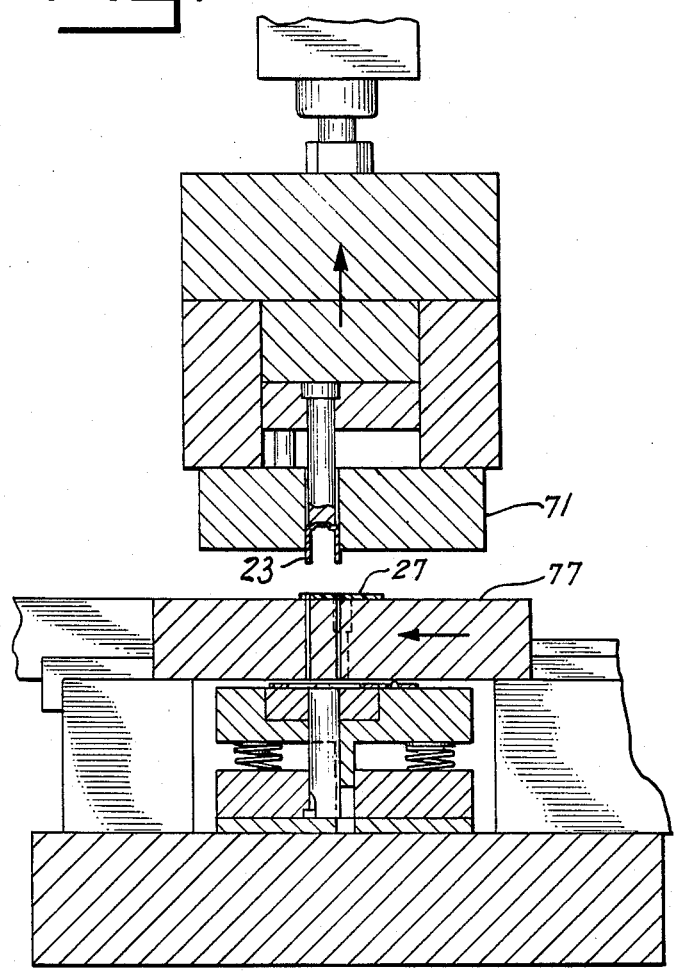

A cutting member 71 moves down against web 59 and drives support member 65 down along a plurality of forming pins 73, as shown in FIG. 22. Forming pins 73 move upward into a plurality of openings 75 formed in cutting member 71 as the member 71 moves downward. The movement of pins 73 relative to cutting member 71 serves to cut each contact from web 59 and bend the legs 33 of each contact downward around the pins 73. Cutting member 71 then moves back upwardly carrying each of the contacts 23 with it, as shown in FIG. 23.

Figure 8:
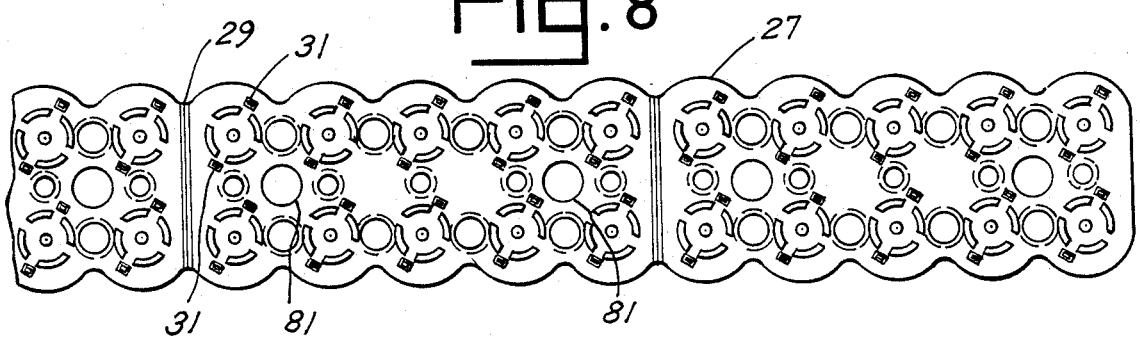
FIG. 8 is a top view of the carrier strip of FIG. 6.
Figure 21:
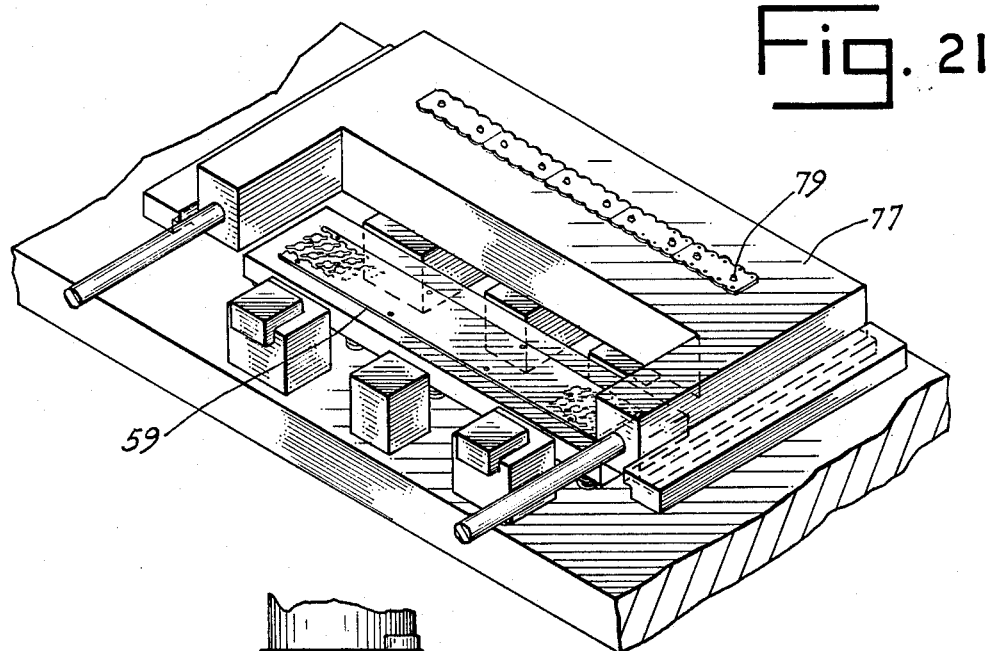
FIG. 21 is a perspective view of a portion of the apparatus of FIG. 20.

A member 77 then slides horizontally underneath cutting member 71 for positioning carrier strip 27 beneath each of the terminal contacts 23. As shown in FIGS. 20, 21, member 77 includes pins 79 for aligning the carrier strip 27 onto member 77. As shown in FIG. 8, apertures 81 are formed in the carrier strip for receiving pins 79.

Figure 24:
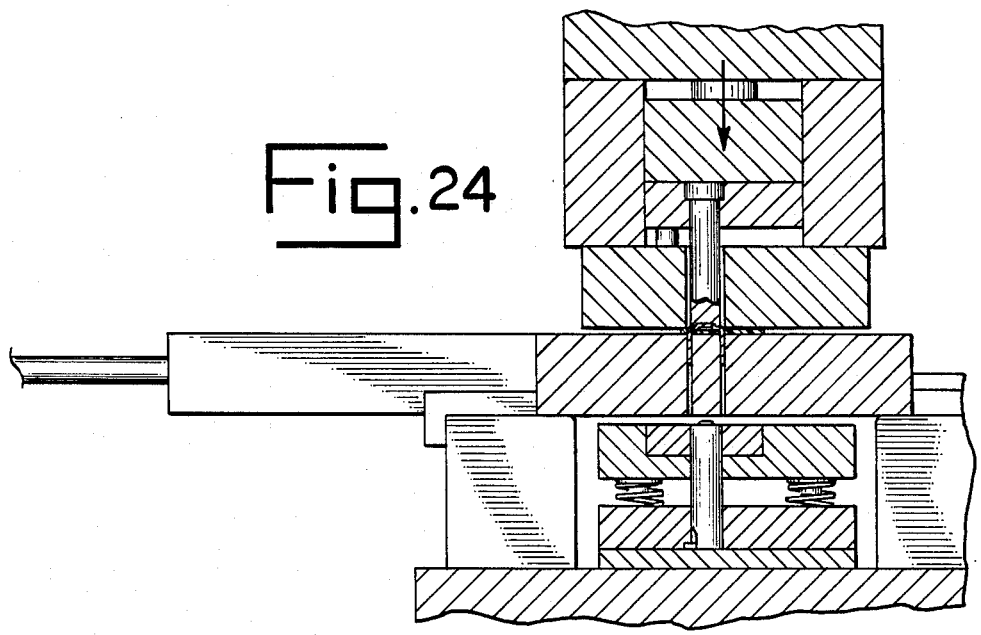

After member 77 has moved beneath cutting member 71, cutting member 71 moves downward a second time forcing terminal legs 33 of the terminal contacts into openings 31 formed in the carrier strip, as shown in FIG. 24. Cutting member 71 moves back upwardly to provide access to the operator to remove the carrier strip 27 which now contains terminal contacts 23, in a form shown in FIG. 13.

Additionally, a vibratory feeder bowl may be used to position or feed metal inserts into a position for forcing the inserts into the openings in the plastic carrier strip.

Figure 25:
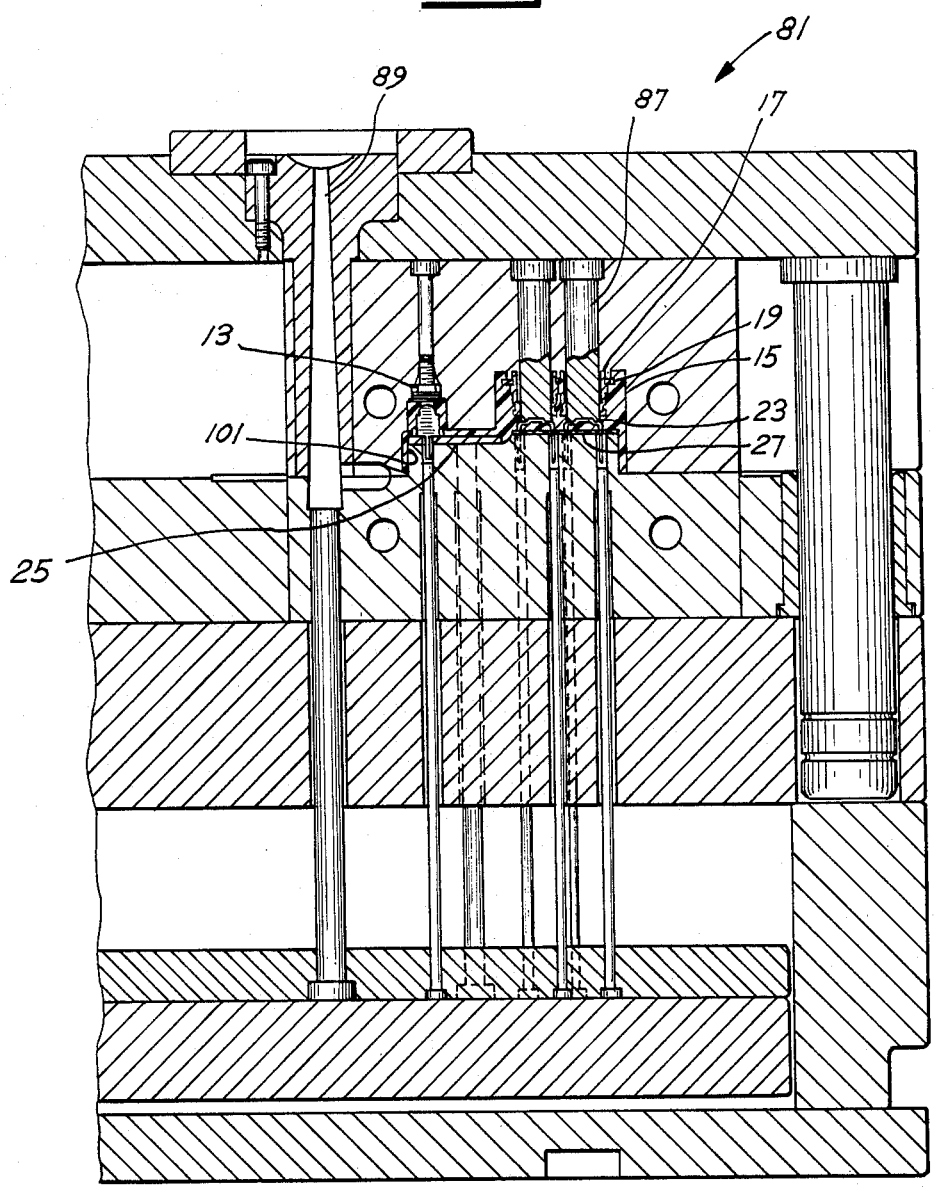
FIG. 25 is a cross sectional side view of a mold for plastic molding the connector block of FIG. 1.
Figure 26:
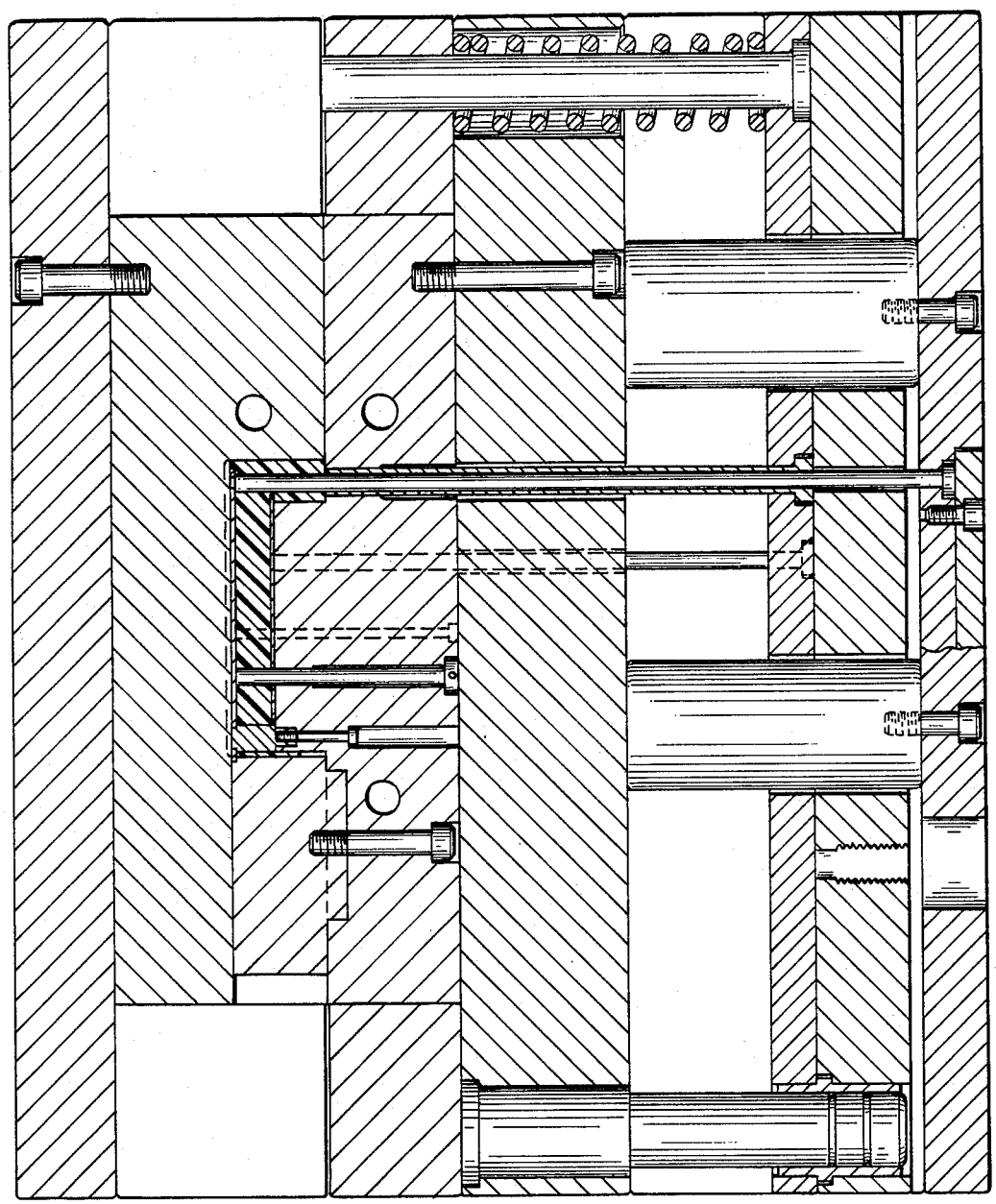
FIG. 26 is a cross sectional end view of the mold of FIG. 25.

Referring to FIGS. 25, 26, a mold 81 is formed of two mold halves for injection molding housing 15. With the mold halves open, the three inserts are placed in one or the other mold half. The metal openings 17 and plate 19 are positioned as a single unit where shown in FIG. 25. A plurality of mold pins 87 pass through the metal openings, preventing liquid plastic from filling the openings. When the mold halves are closed, pins 87 contact the top of contacts 23, preventing plastic from forming on the top of the contact. The first carrier strip 25 and terminal studs 13 are positioned as a single unit where shown in FIG. 25. Similarly, the second carrier strip 27 and contacts 23 are positioned where shown in FIG. 25. AFter the mold halves are closed, liquid plastic is injected along passageway 89 and flows into the mold forming housing 15.

Figure 6:
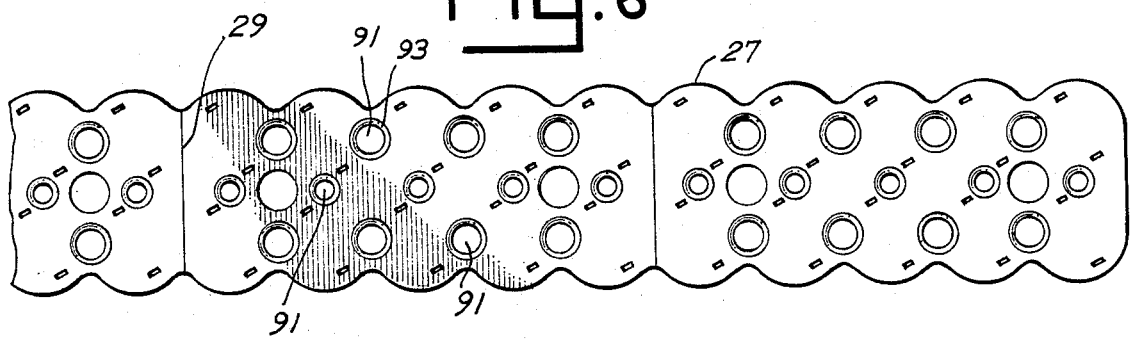
FIG. 6 is a bottom view of a first carrier strip for use in manufacturing the connector block of FIG. 1.
Figure 7:
FIG. 7 is a side view of the carrier strip of FIG. 6.

As shown in FIG. 6, carrier strip 27 includes a plurality of circular apertures 91 which are formed in the strip when the strip is molded. Apertures 91 are formed by bevelled connection surfaces 93, as shown in more detail in FIG. 10. During injection molding, the bottom surface 39 of the strip (FIG. 10) is located on a flat surface of the mold which closes the bottom opening 95 of aperture 91. Plastic is forced into the top opening 97 of the aperture 91 securing the carrier strip 27 to the housing in a riveting fashion. The hardened plastic in aperture 91 serves as a rivet abutting connection surfaces 93 preventing the strip from being removed from housing 15.

Similarly, the side edge 99 of carrier strip 25 (FIG. 15) provides a connection surface against which liquid plastic is forced for securing the carrier to the housing. Referring to FIG. 25, liquid plastic may slightly wrap around the carrier 101 of the strip, if desired, for retaining the strip to the housing. A shrinkage of the plastic of the housing against the side edge 99 serves to hold the plastic carrier to the housing.

It is to be understood, however, that various changes and modifications may be made without departing from the true scope and spirit of the present invention as set forth and defined in the following claims.

What is claimed is:

1. A method of manufacturing an electrical terminal block having a plastic injection molding housing encapsulating a plurality of metal inserts, each metal insert having at least one terminal peg, and using an article mold to mold the housing, comprising the steps of:

molding a single planar plastic insert, said molding including molding a plurality of apertures passing through the planar plastic insert and of a size for receiving in interference fit each terminal peg of the plurality of metal inserts for preventing injected liquid plastic under pressure from passing through a said aperture when the terminal peg is received within the said aperture, said molding including locating the apertures to space apart the metal inserts to electrically insulate the inserts and said molding including forming connection surfaces for connecting the plastic insert to the housing;

forcing the terminal pegs of the plurality of metal inserts into the molded apertures of the molded plastic insert causing an interference sealing around each terminal peg, said terminal pegs extending below said plastic insert;

providing an article mold having a flat receiving area for placement of the molded plastic insert and its force-fit metal inserts as one unit onto the receiving area, said article mold providing open areas beneath said flat receiving area for receiving the terminal pegs which extend below the plastic insert and said article mold having a mold shape for molding the housing;

placing the single plastic insert onto the receiving area with the terminal pegs of its force-fit metal inserts extending into said open areas of the mold;

closing the mold about the single plastic insert and its force-fit metal inserts;

injecting plastic into the article mold for molding the housing around the single plastic insert and its force-fit metal inserts said injecting liquid plastic including forcing liquid plastic under pressure against said plastic insert in the area of said apertures and against the connection surfaces for securing the plastic insert to the molded housing while preventing liquid plastic from seeping out and around the terminal pegs and removing the article formed of the housing and plastic insert with its force-fit metal inserts from the mold.

2. A method according to claim 1 including metal forming a plurality of the metal terminal inserts from a web of thin metal with each of the inserts connected to the web by a portion of the thin metal;

substantially simultaneously cutting each of the inserts from the web;

substantially simultaneously bending the terminal peg of each of the inserts into a position for forming the following step; and substantially, simultaneously forcing each of the terminal pegs of the inserts into the molded apertures of the molded plastic insert.

3. A method according to claim 1 wherein said step of molding a single plastic insert includes molding a plurality of raised support members for seating against the metal insert.

4. A method according to claim 1 wherein said step of molding a single plastic insert includes molding the plurality of apertures with beveled entrance surfaces for guiding the pegs of the inserts into the apertures during said step of forcing.

5. A method according to claim 1 wherein said step of molding a single plastic insert includes molding a raised area for seating against a portion of the metal insert; and wherein said step of placing the single plastic insert into the article mold includes the step of closing the article molds and forcing a metal insert within the raised area to compensate for tolerance in the shape of the metal insert.

* * * * *